(12) United States Patent
Saimaru et al.

(10) Patent No.: US 9,209,432 B2
(45) Date of Patent: Dec. 8, 2015

(54) SECONDARY BATTERY AND METHOD FOR PRODUCING THE SAME

(75) Inventors: Sho Saimaru, Hitachinaka (JP); Ryuji Kohno, Mito (JP)

(73) Assignee: HITACHI AUTOMOTIVE SYSTEMS, LTD. (JP)

( * ) Notice: Subject to any disclaimer, the term of this patent is extended or adjusted under 35 U.S.C. 154(b) by 0 days.

(21) Appl. No.: 13/818,254

(22) PCT Filed: Feb. 23, 2011

(86) PCT No.: PCT/JP2011/053972
§ 371 (c)(1),
(2), (4) Date: Feb. 21, 2013

(87) PCT Pub. No.: WO2012/029336
PCT Pub. Date: Mar. 8, 2012

(65) Prior Publication Data
US 2013/0157094 A1 Jun. 20, 2013

(30) Foreign Application Priority Data
Aug. 31, 2010 (JP) .................. 2010-194074

(51) Int. Cl.
*H01M 2/26* (2006.01)
*H01M 2/02* (2006.01)
*H01M 10/0587* (2010.01)
*H01M 10/04* (2006.01)

(52) U.S. Cl.
CPC ............ *H01M 2/0237* (2013.01); *H01M 2/024* (2013.01); *H01M 2/263* (2013.01);
(Continued)

(58) Field of Classification Search
CPC .......... H01M 10/0431; H01M 10/049; H01M 10/0587; H01M 2/0237; H01M 2/024; H01M 2/263; H01M 6/10; H01M 10/125; H01M 10/286; H01M 2006/10; Y02E 60/12
USPC ...................... 429/121, 122, 133, 164, 231.95
See application file for complete search history.

(56) References Cited

U.S. PATENT DOCUMENTS 5,354,629 A * 10/1994 Kuroda et al. .................. 429/94
2003/0054259 A1* 3/2003 Murai et al. .................. 429/330
(Continued)

FOREIGN PATENT DOCUMENTS

JP 2000-150306 A 5/2000
JP 2002-008708 A 1/2002
(Continued)

*Primary Examiner* — Patrick Ryan
*Assistant Examiner* — Ben Lewis
(74) *Attorney, Agent, or Firm* — Volpe and Koenig, P.C.

(57) ABSTRACT

A secondary battery has: an electrode group which includes sheet-form positive and negative electrode plates each including a metallic foil having an active material applied onto both sides of the metallic foil, and a separator disposed between the positive and negative electrode plates, wherein the positive and negative electrode plates and the separator are spirally wound together around a winding core into a flattened shape, wherein the electrode group has, at the both ends thereof as viewed in the winding core direction, respectively formed metallic foil exposed portions of the positive and negative electrode plates onto which the active material is not applied; a battery container which contains the electrode group therein, wherein the battery container has a battery casing and a battery cap; and positive and negative external terminals electrically connected to the metallic foil exposed portions of the positive and negative electrode plates, respectively. Winding end portions in the metallic foil exposed portions of the positive and negative electrode plates are arranged opposite to the inner surface of the battery container through respective conducting members.

13 Claims, 8 Drawing Sheets

(52) U.S. Cl.
CPC ........ *H01M10/049* (2013.01); *H01M 10/0431* (2013.01); *H01M 10/0587* (2013.01); *Y02E 60/122* (2013.01); *Y10T 29/49108* (2015.01)

(56) References Cited

U.S. PATENT DOCUMENTS

2008/0038627 A1* 2/2008 Yamauchi et al. ............... 429/53
2008/0176142 A1* 7/2008 Inagaki et al. ................ 429/330

FOREIGN PATENT DOCUMENTS

| JP | 2003-346881 | * 12/2003 | ............ H01M 10/04 |
| JP | 2008-004274 A | 1/2008 | |
| JP | 2008-066254 A | 3/2008 | |

* cited by examiner

SECONDARY BATTERY AND METHOD FOR PRODUCING THE SAME

TECHNICAL FIELD

The present invention relates to a secondary battery and a method for producing the same.

BACKGROUND ART

In hybrid cars and electric vehicles which are required to have large power and large capacity, it is necessary to form a battery pack from an assembly of several tens of or hundred or more unit batteries. For increasing the battery mounting density, the development of a rectangular secondary battery has been made.

For example, the non-aqueous electrolyte secondary battery described in patent document 1 has an electrode group including positive and negative electrode plates each having a current collector foil, and a separator for insulating them, wherein the positive and negative electrode plates and the separator are spirally wound together into a flattened shape. The electrode group has formed at the both ends thereof respective exposed portions having no active material mixture applied onto the positive and negative current collector foils so that the respective metallic foils are exposed. The metallic foil exposed portions are positioned opposite to each other in the electrode group. The external shape of the flattened electrode group has at both ends a pair of curved surface portions around which the positive and negative electrode plates are wound, and top and bottom plane portions which connect the curved surface portions, and the electrode group is inserted into a battery casing so that one of the curved surface portions is disposed on the bottom side of the battery casing.

RELATED ART REFERENCE

Patent Document

Patent document 1: JP-A-2008-66254

SUMMARY OF THE INVENTION

Technical Problem

In a conventional secondary battery, according to the length of an electrode foil determined from the battery capacity, the cutting point of a metallic foil is determined. Therefore, the position of the winding end portion of the metallic foil, which corresponds to the cutting point of the metallic foil, is indefinite. Thus, there is a danger that, when inserting the electrode group into a battery casing, the position of the winding end portion causes the winding end portion of the metallic foil to be caught by the opening of the battery casing. For this reason, an operation of carefully inserting the electrode group into the battery casing so that the metallic foil does not turn upward is required, thus increasing the production time for the battery.

Solution to Problem

A secondary battery according to a first mode of the invention includes: an electrode group including sheet-form positive and negative electrode plates each including a metallic foil having an active material applied onto both sides of the metallic foil, and a separator disposed between the positive and negative electrode plates, wherein the positive and negative electrode plates and the separator are spirally wound together around a winding core into a flattened shape, wherein the electrode group has, at the both ends thereof as viewed in the winding core direction, respectively formed metallic foil exposed portions of the positive and negative electrode plates onto which the active material is not applied; a battery container which contains the electrode group therein, wherein the battery container has a battery casing and a battery cap; and positive and negative external terminals electrically connected to the metallic foil exposed portions of the positive and negative electrode plates, respectively, wherein winding end portions in the metallic foil exposed portions of the positive and negative electrode plates are arranged opposite to the inner surface of the battery container through respective conducting members.

A secondary battery according to a second mode of the invention is directed to the secondary battery of the first mode, wherein the metallic foil exposed portions of the positive and negative electrode plates are stacked in the thickness wise direction of the battery casing to form respective stacked structures, wherein the stacked structures are compressed, and the respective conducting members are bonded to the outermost layers of the stacked structures.

A secondary battery according to a third mode of the invention is directed to the secondary battery of the second mode, wherein the respective conducting members have, respectively, the same polarities as the polarities of the corresponding positive and negative electrode plates.

A secondary battery according to the fourth mode of the invention is the secondary battery of the third mode, wherein the respective conducting members are positive and negative connecting plates which electrically connect the respective metallic foil exposed portions to the positive and negative external terminals, respectively, wherein the positive and negative connecting plates are attached to the battery cap.

A secondary battery according to a fifth mode of the invention is directed to the secondary battery of the first mode, wherein the metallic foil exposed portions of the positive and negative electrode plates are stacked in the thickness wise direction of the battery casing to form respective stacked structures, wherein the stacked structures of the positive and negative electrode plates are respectively bonded to positive and negative connecting plates which electrically connect the respective metallic foil exposed portions to the positive and negative external terminals, respectively.

A secondary battery according to a sixth mode of the invention is directed to the secondary battery of the first mode, wherein the metallic foil exposed portions of the positive and negative electrode plates are stacked in the thickness wise direction of the battery casing to form respective stacked structures, wherein the stacked structures of the positive and negative electrode plates are respectively sandwiched between positive and negative connecting plates which electrically connect the respective metallic foil exposed portions to the positive and negative external terminals, respectively, and respective current collecting protective plates, and bonded together.

A secondary battery according to a seventh mode of the invention is directed to the secondary battery of the fifth or sixth mode, wherein the battery casing has a shape of thin rectangular parallelopiped having wide surfaces as top and bottom surfaces and narrow surfaces as sidewalls, wherein the electrode group has a pair of plane portions opposite to the wide surfaces extending on the top and bottom of the battery casing, and turning portions at which the positive and negative electrode plates are turned back at the both ends of the pair of plane portions, wherein the winding end portion is positioned in the plane portion.

A secondary battery according to an eighth mode of the invention is directed to the secondary battery of any one of the fifth to seventh modes, wherein the positive and negative connecting plates have respective joint leaves provided so as to face the wide surfaces of the battery casing, and respective connecting members which connect the joint leaves to the positive and negative external terminals, respectively, each connecting member extending to the battery cap along the narrow surface of the battery casing, wherein the joint surfaces are respectively bonded to the winding end portions of the positive and negative electrode plates.

A secondary battery according to a ninth mode of the invention is directed to the secondary battery of the fifth to eighth modes, wherein the winding end portions of the positive and negative electrode plates are arranged in positions opposite to the same plane portion of the battery casing.

A secondary battery according to a tenth mode of the invention is directed to the secondary battery of any one of the first to ninth modes, wherein the winding end portion of the negative electrode plate is arranged so as to cover the winding end portion of the positive electrode plate.

A method for producing a secondary battery according to an eleventh mode of the invention includes: a first step of forming an electrode group including sheet-form positive and negative electrode plates each including a metallic foil having an active material applied onto both sides of the metallic foil, and a separator disposed between the positive and negative electrode plates, wherein the positive and negative electrode plates and the separator are spirally wound together around a winding core into a flattened shape, wherein the electrode group has, at the both ends thereof as viewed in the winding core direction, respectively formed metallic foil exposed portions of the positive and negative electrode plates onto which the active material is not applied; a second step of connecting the metallic foil exposed portions of the positive and negative electrode plates to positive and negative external terminals, respectively, by positive and negative connecting plates; a third step of placing the electrode group having connected thereto the positive and negative connecting plates in a battery container having a thin shape; and a fourth step of closing the battery container after the third step, wherein the first step includes a fifth step of cutting the positive and negative electrode plates so that winding end portions in the metallic foil exposed portions of the positive and negative electrode plates are respectively arranged in predetermined positions on the surface of the electrode group, wherein, in the second step, the winding end portions of the positive and negative electrode plates are respectively bonded to the positive and negative connecting plates.

A secondary battery according to a twelfth mode of the invention is directed to the method for producing a secondary battery according to the eleventh mode, wherein the battery container has a shape of thin rectangular parallelopiped having wide surfaces as top and bottom surfaces and narrow surfaces as sidewalls, wherein, in the first step, winding is performed so that the electrode group has a pair of plane portions opposite to the wide surfaces extending on the top and bottom of the battery container, and turning portions at which the positive and negative electrode plates are turned back at the both ends of the pair of plane portions, and the winding end portion is positioned in the plane portion.

A secondary battery according to a thirteenth mode of the invention is directed to the method of the twelfth mode, wherein, in the first step, the winding end portions of the positive and negative electrode plates are arranged in positions opposite to the same plane portion of the battery container.

A secondary battery according to a fourteenth mode of the invention is directed to the method for producing a secondary battery according to the eleventh to thirteenth modes, wherein the winding end portion of the negative electrode plate is arranged so as to cover the winding end portion of the positive electrode plate.

A method for producing a secondary battery according to a fifteenth mode of the invention is directed to the method for producing a secondary battery according to the eleventh to fourteenth modes, wherein the fifth step includes:

a sixth step of measuring winding lengths of the positive and negative electrode plates, and a seventh step of determining cutting points of the positive and negative electrode plates, based on the respective winding lengths of the positive and negative electrode plates measured in the sixth step, wherein, in the seventh step, the lengths are determined so that the winding end portions in the metallic foil exposed portions of the positive and negative electrode plates are arranged opposite to the inner surface of the battery container through the respective positive and negative connecting plates having, respectively, the same polarities as the polarities of the corresponding electrode plates.

Advantageous Effects of Invention

In the invention, there is no need to employ a special step for preventing the winding end portions in the exposed portions of the positive and negative electrode plates from turning upward, and hence the production time for the battery can be reduced. Especially in the automobile application, the number of the batteries mounted per automobile can be increased, and the invention has very excellent effects with respect to the productivity and cost.

DESCRIPTION OF EMBODIMENTS

Hereinbelow, a first embodiment in which the present invention is applied to a rectangular secondary battery will be described with reference to the accompanying drawings.

First Embodiment

FIGS. 1 to 7 show a rectangular secondary battery according to the first embodiment. The secondary battery of the embodiment is a battery having a spirally wound electrode group contained in a thin battery casing, and is preferably used as a secondary battery for driving a rotating motor particularly for a hybrid vehicle or an electric vehicle.

Figure 1:
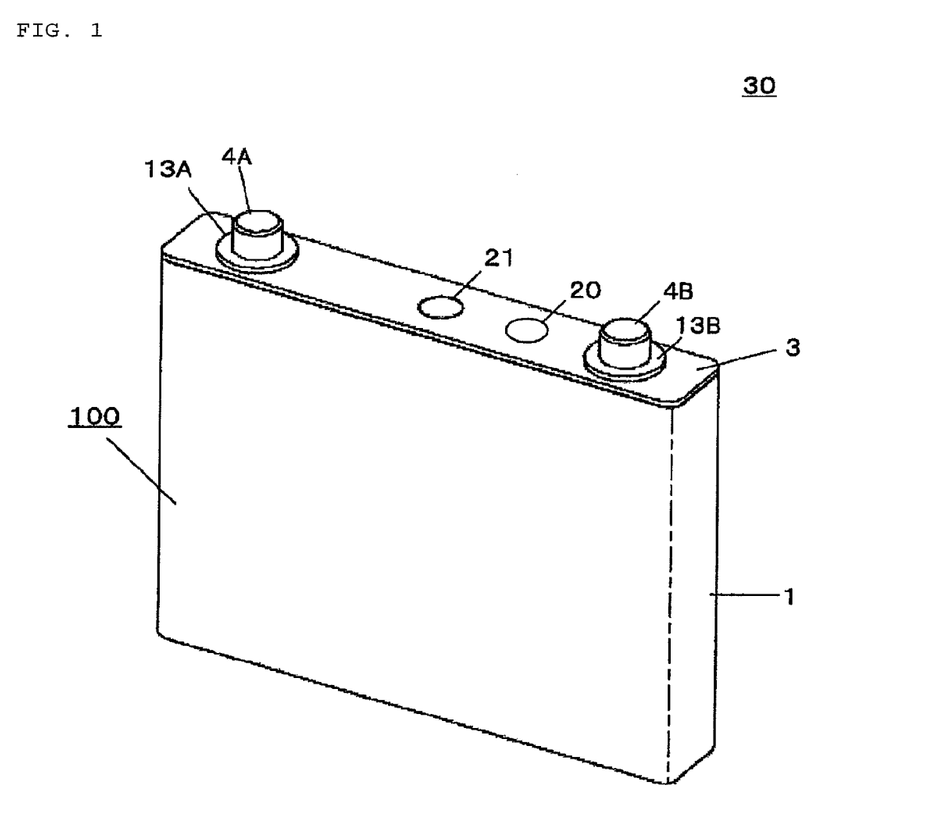
[FIG. 1] Perspective view showing a secondary battery according to a first embodiment of the invention.
Figure 2:
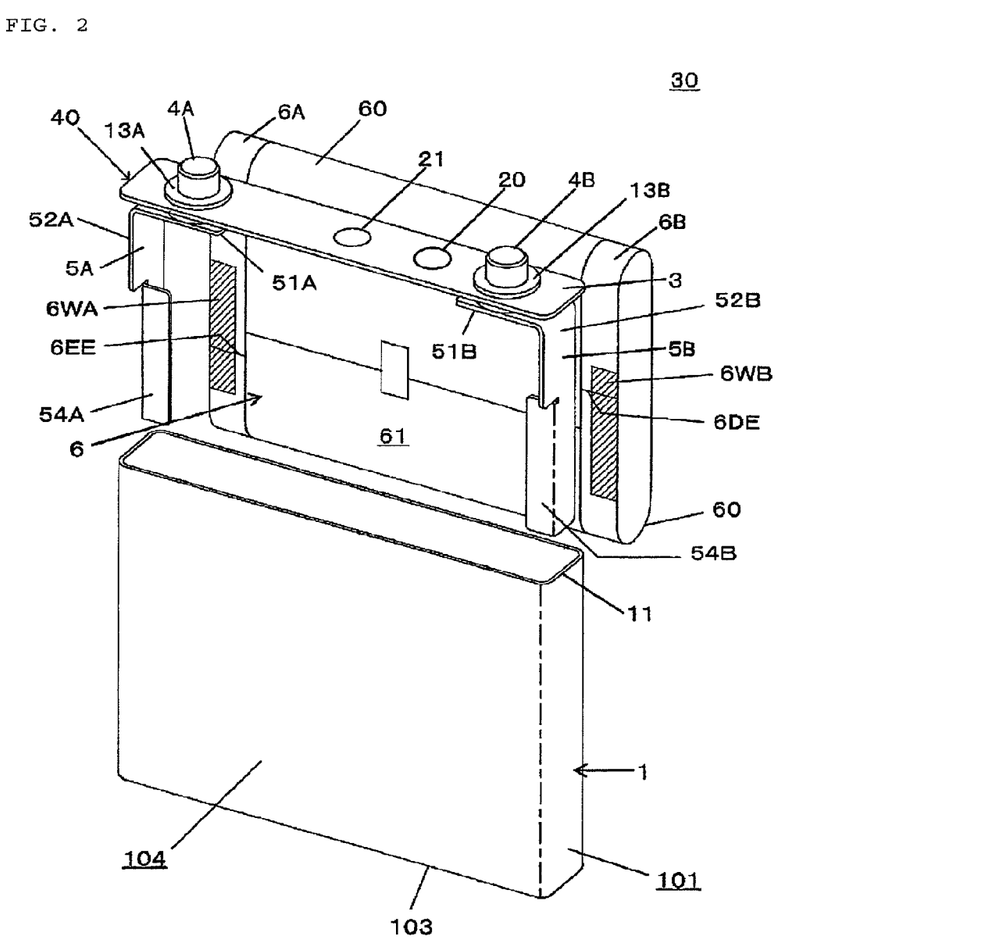
[FIG. 2] Exploded perspective view showing the state of the secondary battery of FIG. 1 before bonding an electrode group.
Figure 3:
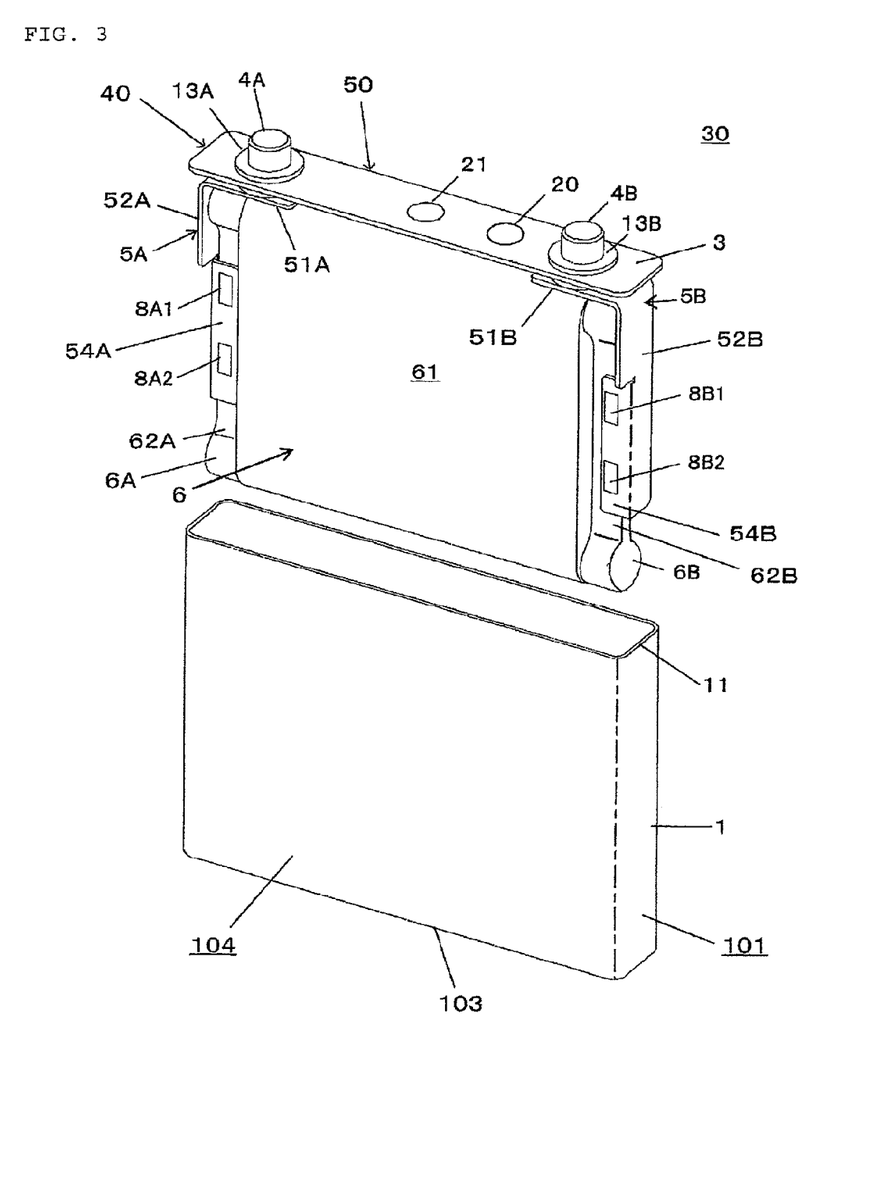
[FIG. 3] Exploded perspective view showing the state of the secondary battery of FIG. 1 after bonding the electrode group.

As shown in FIGS. 1 to 3, a battery 30 has an electrode group 6, and a battery casing 1 containing therein the electrode group 6. The battery casing 1 has formed an opening 11 through which the electrode group 6 is inserted into the casing, and the opening 11 is sealed up by a battery cap 3. Further, an electrolytic solution is fed into the battery casing 1 through a feed hole 20 formed in the battery cap 3, and the feed hole 20 is sealed by a plug. The battery cap 3 is formed into a shape of flat plate corresponding to the outline of the opening 11, and seals up the opening 11 without any gap. In FIG. 1, reference numeral 100 designates a battery container including the battery casing 1 and the battery cap 3.

The battery cap 3 has not shown through-holes formed therein, and positive and negative external terminals 4A, 4B are inserted to the through-holes. The external terminals 4A, 4B are fixed to the battery cap 3, together with below-mentioned positive and negative connecting plates 5A, 5B. Further, insulating sealing materials 13A, 13B are fitted to the external terminals 4A, 4B to prevent the occurrence of leakage around the external terminals 4A, 4B.

The battery casing 1 and battery cap 3 are formed from an aluminum alloy or the like. The connecting plate 5A and external terminal 4A on the positive side are formed from an aluminum alloy, and the connecting plate 5B and external terminal 4B on the negative side are formed from a copper alloy.

A sealing material 13 is formed from an insulating resin, such as polyphenylene sulfide (PPS), polybutylene terephthalate (PBT), or perfluoroalkoxyfluorine (PFA). As an electrolytic solution, for example, a non-aqueous electrolytic solution prepared by dissolving a lithium salt, such as lithium hexafluorophosphate (LiPF$_6$), in a carbonate organic solvent, such as ethylene carbonate, is used.

The connecting plates 5A, 5B are mechanically and electrically connected to the external terminals 4A, 4B, respectively, in the battery casing 1. The electrode group 6 is mechanically and electrically connected to the connecting plates 5A, 5B. Thus, the external terminals 4A, 4B are electrically connected to the electrode group 6, and the electrode group 6 is mechanically supported by the battery cap 3.

As shown in FIG. 2, the battery cap 3, external terminals 4A, 4B, and connecting plates 5A, 5B are mechanically unified to assemble a cap assembly 40 in advance, and, as shown in FIG. 3, the electrode group 6 is connected to the cap assembly 40 to assemble an electrode assembly 50.

(Electrode Group)

Figure 4:
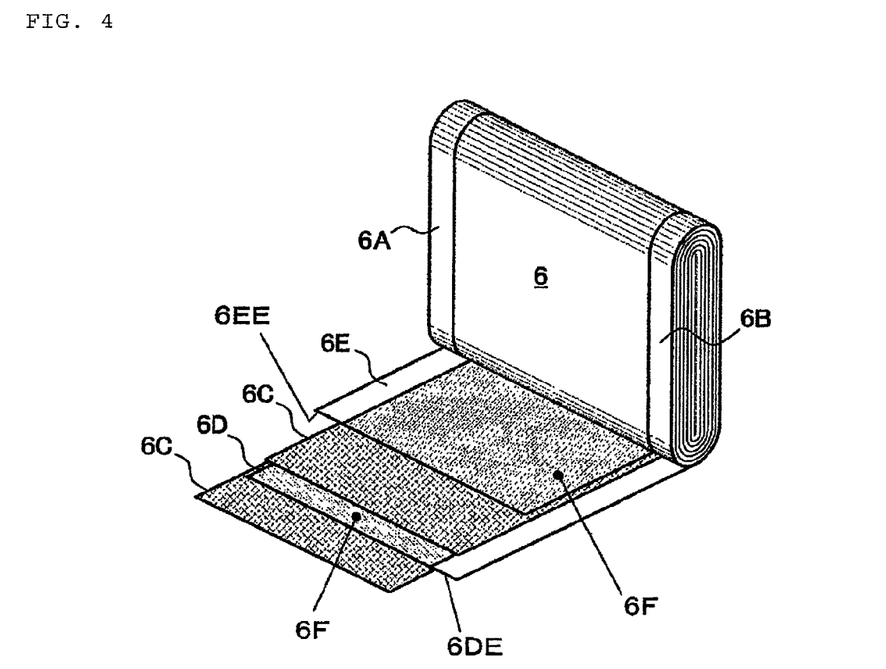
[FIG. 4] Perspective view showing the electrode group of the secondary battery of FIG. 1.

As shown in FIG. 4, the electrode group 6 includes sheet-form positive and negative electrode plates 6E, 6D and a separator 6C disposed between them, wherein the positive and negative electrode plates 6E, 6D and the separator 6C are spirally wound together around a winding core into a flattened shape, and the electrode group is contained in a flattened rectangular parallelopiped space, i.e., a thin space defined by the battery casing 1 and the battery cap 3. The not shown winding core is, for example, a rectangular flat plate smaller in size than the size of the electrode group 6 in the vertical width direction, and can be formed from an insulating material. The positive and negative electrode plates 6E, 6D include, respectively, positive and negative current collector foils, i.e., metallic foils, each having an active material mixture applied onto both sides of the metallic foil. In FIG. 4, reference numeral 6F designates a coated portion onto which an active material mixture is applied. At the both ends of the electrode group 6 as viewed in the winding core direction, uncoated portions onto which no active material mixture is applied, i.e., metallic foil exposed portions 6A, 6B are formed. The uncoated portions 6A, 6B are formed in the electrode group 6 in respective positions opposite to each other as viewed in the winding core direction.

With respect to the positive electrode active material, a positive electrode active material mixture containing a lithium-containing transition metal composite oxide, such as lithium manganate, is used. With respect to the negative electrode active material, a negative electrode active material mixture containing a carbon material capable of reversibly absorbing and releasing lithium ions, such as graphite, is used.

As shown in FIG. 3, the uncoated portions 6A, 6B respectively have plane portions 62A, 62B each pressed into a plane, and the uncoated portions 6A, 6B are electrically connected to the connecting plates 5A, 5B at the plane portions 62A, 62B.

Figure 5:
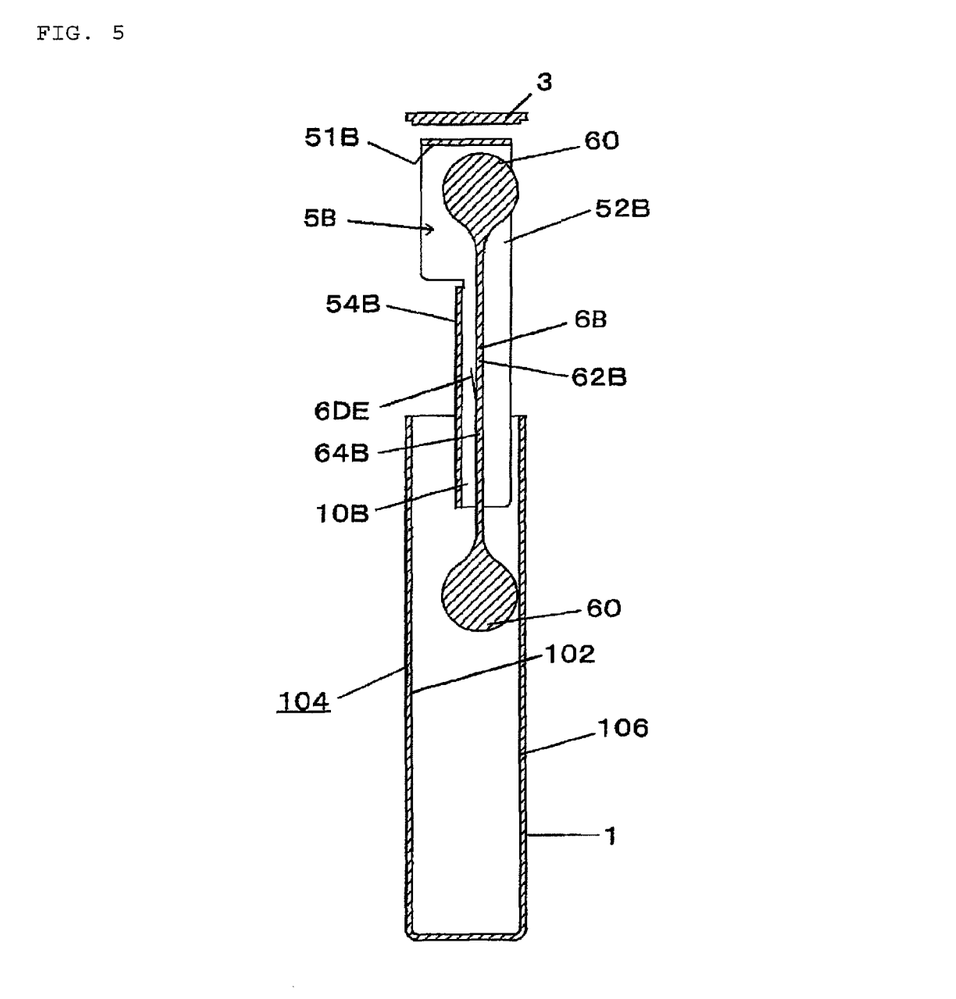
[FIG. 5] View showing the state of bonding of the electrode group to a connecting plate.

The external shape of the electrode group 6 is described with reference to FIG. 5. The outer periphery of the wound electrode group 6 is formed from turning portions 60 at both ends respectively opposite to the bottom of the battery casing and the inner surface of the battery cap, and plane portions 61 extending on the top and bottom of the electrode group between the turning portions 60. The electrode group 6 is contained in the battery casing 1 so that the winding core of the electrode group 6 is arranged parallel to the plane forming the opening 11 and parallel to a wide surface 104 of the battery casing 1. When the winding core is a rectangular flat plate, the top and bottom surfaces of the rectangular flat plate are arranged parallel to the wide surface 104.

(Positive and Negative Connecting Plates)

The positive and negative connecting plates 5A, 5B are described with reference to FIGS. 2 and 3. The positive and negative connecting plates 5A, 5B have a similar construction, and therefore only the connecting plate 5B as a representative example is described in detail.

The connecting plate 5B has a base portion 51B extending along the inner surface of the battery cap 3, a side portion 52B which is curved from the base portion 51B at a substantially right angle and extends to the lower portion of the electrode group 6 along a narrow sidewall 101 of the battery casing 1 toward a bottom 103, and a joint leaf 54B which is the lower half portion of the side portion 52B and is curved toward the electrode group 6, namely, curved along the wide surface 104 of the battery casing 1 at a substantially right angle. The joint leaf 54B and side portion 52B together form a unified structure having an L-shaped cross-section and have high strength and high rigidity.

(Electrode Assembly)

FIG. 3 is a perspective view of an electrode assembly 50. The electrode assembly 50 includes the cap assembly 40 and the electrode group 6 which are connected to each other. The joint leaf 54B constituting the cap assembly 40 is ultrasonic bonded to the uncoated portion 6B of the electrode group 6 at two sites of bonding sites 8B1, 8B2. A joint leaf 54A constituting the cap assembly 40 is ultrasonic bonded to the uncoated portion 6A of the electrode group 6 at two sites of bonding sites 8A1, 8A2.

—With Respect to Winding End Portions of the Positive and Negative Electrode Plates—

Figure 6:
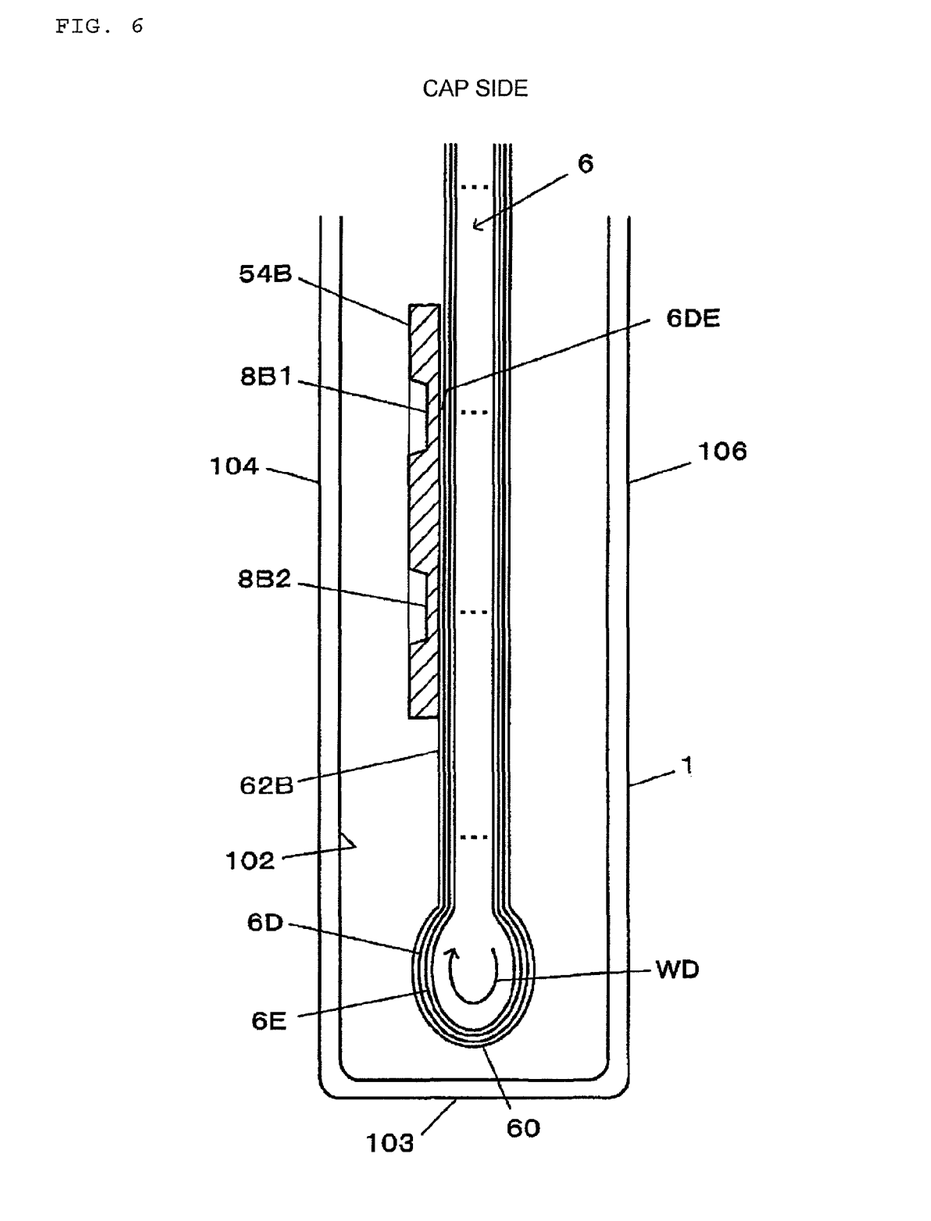
[FIG. 6] Explanatory view showing the terminal of the electrode group in the first embodiment.

The winding end portions of the positive and negative electrode plates are described with reference to FIGS. 2, 4, 5, and 6. In FIG. 5, for showing an end portion 6DE of the negative electrode plate 6D, the joint leaf 54B and the uncoated portion 6B are indicated so that a gap is provided between them. FIG. 6 is a cross-sectional view showing an ultrasonic bonded portion in the uncoated portion 6B, and reference character WD designates the winding direction of the positive and negative electrode plates 6E, 6D.

As shown in FIGS. 2, 4, and 6, in the electrode group 6, the negative electrode plate 6D is wound so that the winding outermost layer of the negative electrode plate 6D covers the winding outermost layer of the positive electrode plate 6E and the end portion 6DE of the negative electrode plate 6D is positioned beyond an end portion 6EE of the positive electrode plate 6E.

As clearly shown in FIG. 6, the plane portion 62B, which is formed by compressing the uncoated portion 6B, and the joint leaf 54B are ultrasonic bonded together at the ultrasonic bonding sites 8B1, 8B2. On the positive side (not shown), the plane portion 62A, which is formed by compressing the uncoated portion 6A into a plane, and the joint leaf 54A are ultrasonic bonded together at the ultrasonic bonding sites 8A1, 8A2. When the winding end portions of the positive and negative electrode plates 6E, 6D are present in the ultrasonic bonding sites 8A1, 8A2, 8B1, 8B2 of the plane portions 62A, 62B, the end portions 6EE, 6DE of the positive and negative electrode plates 6E, 6D are fixed by welding.

Specifically, the metallic foil exposed portions 6A, 6B of the positive and negative electrode plates 6E, 6D form respective stacked structures, and the stacked structures are compressed to form plane portions 62A, 62B, and joint leaves 54A, 54B, which are conducting members, are bonded to the outermost layers of the respective stacked structures. The joint leaves 54A, 54B have, respectively, the same polarities as the polarities of the corresponding metallic foil exposed portions.

[Step for Producing an Electrode Group]

Figure 7:
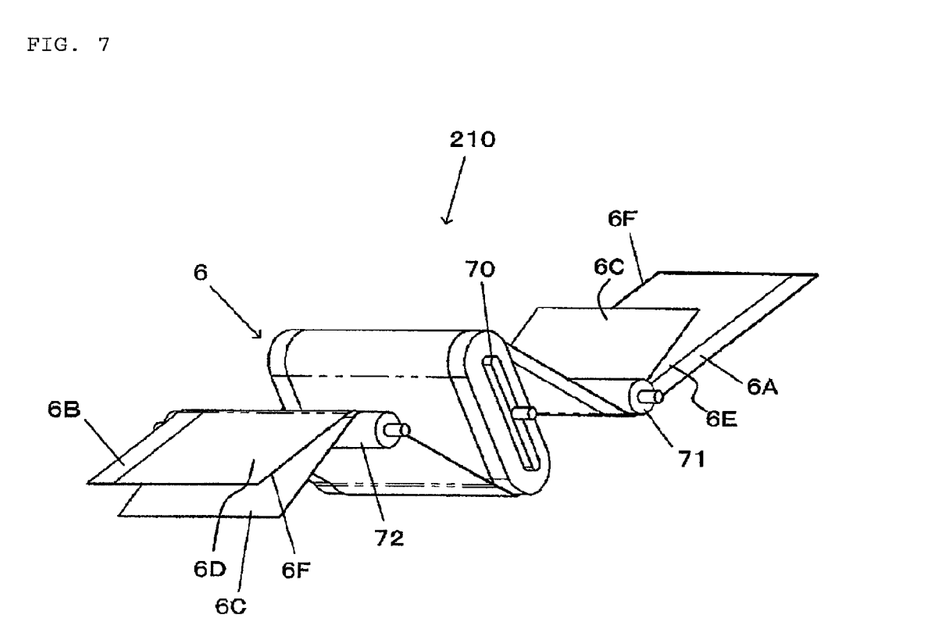
[FIG. 7] Perspective view showing an apparatus for producing a spirally wound group in the first embodiment.

FIG. 7 is a perspective view showing the state of winding the electrode group 6 by means of a winding apparatus 210. As shown in FIG. 7, in winding for the flattened, spirally wound electrode group 6, the two separators 6C are wound several times around a bobbin 70 rotating around a horizontal axis and then, the positive electrode plate 6E is fed from one side of the bobbin 70 and disposed under one separator 6C and wound. Further, the negative electrode plate 6D is fed from the other side of the bobbin 70 and disposed on the other separator 6C and wound. While guiding the separator 6C and negative electrode plate 6D using a horizontal guide roll 72 and guiding the separator 6C and positive electrode plate 6E using a horizontal guide roll 71, the bobbin 70 is rotated to wind the separator 6C, negative electrode plate 6D, separator 6C, and positive electrode plate 6E into a stacked structure.

The winding apparatus 210 is provided with a not shown cutter, length meter, and controller. The respective total lengths of the positive and negative electrode plates 6E, 6D are determined according to a desired battery capacity, and, when predetermined lengths of the wound electrode plates are measured by the length meter, the controller controls the cutter to cut the positive and negative electrode plates 6E, 6D. It is preferred that the lengths of the positive and negative electrode plates 6E, 6D are determined so that the end portions 6EE, 6DE of the positive and negative electrode plates 6E, 6D are present in the ultrasonic bonding sites. In the first embodiment, preferred lengths are such that the end portions 6EE, 6DE are present in the ultrasonic bonding sites 8A1, 8A2, 8B1, 8B2 of the plane portions 62A, 62B in contact with the joint leaves 54A, 54B.

In the secondary battery of the first embodiment, the design total lengths of the positive and negative electrode plates 6E, 6D are determined so that the electrode plate end portions 6EE, 6DE are positioned within the respective ranges in which the joint leaves 54A, 54B extend in the depth direction of the battery casing. However, a problem may occur in which when the electrode plates are cut at the points measured by the length meter as design total length values, the electrode plate end portions 6EE, 6DE are not positioned in the respective ranges in which the joint leaves 54A, 54B extend. This is caused due to a variation of the tensile force exerted to the electrode plates 6E, 6D when winding the electrode plates 6E, 6D, and the like. For removing the problem, in the winding apparatus 210 in the first embodiment, when such a phenomenon occurs, the electrode plates 6E, 6D are wound so that the electrode plate end portions 6EE, 6DE are present in the design positions, and then cut by the cutter. Alternatively, the position of the cutter is changed and then the electrode plates are cut.

For example, the following step can be employed.

The positions of the electrode plate end portions 6EE, 6DE are detected by image processing or the like. The winding apparatus 210 is driven and controlled to wind the positive and negative electrodes 6E, 6D so that the electrode plate end portions 6EE, 6DE are positioned in the respective ranges in which the joint leaves 54A, 54B extend. Alternatively, the number of winding required until the positions of the electrode plate end portions 6EE, 6DE detected by image processing are present in the respective ranges in which the joint leaves 54A, 54B extend is calculated, and the electrode plates are wound at the corresponding rotation angle. Of course, an operator may perform the above-mentioned operation while visually measuring the positions.

A method for producing the above-described rectangular secondary battery has first to seventh steps. The first step is a step for forming the electrode group 6 which includes the positive and negative electrode plates 6E, 6D and the separator 6C disposed between them, wherein the positive and negative electrode plates 6E, 6D and the separator 6C are spirally wound together around a winding core into a flattened shape. The second step is a step for connecting the metallic foil exposed portions 6A, 6B of the positive and negative electrode plates 6E, 6D to the positive and negative external terminals 4A, 4B, respectively, by the positive and negative connecting plates 5A, 5B. The third step is a step for placing the electrode group 6 having connected thereto the positive and negative connecting plates 5A, 5B in the battery container 100 having a shape of flattened rectangular parallelopiped. The fourth step is a step for closing the battery container 10 after the third step. The first step includes a fifth step of cutting the positive and negative electrode plates 6E, 6D so that winding end portions 6EE, 6DE in the metallic foil exposed portions 6A, 6B of the positive and negative electrode plates 6E, 6D are respectively arranged in predetermined positions on the surface of the electrode group 6.

Further, in the method for producing the rectangular secondary battery, the fifth step includes a sixth step of measuring winding lengths of the positive and negative electrode plates 6E, 6D, and a seventh step of determining cutting points of the positive and negative electrode plates 6E, 6D, based on the respective winding lengths of the positive and negative electrode plates 6E, 6D measured in the sixth step. In the seventh step, the lengths are determined so that the winding end portions 6EE, 6DE in the metallic foil exposed portions 6A, 6B of the positive and negative electrode plates 6E, 6D are arranged opposite to an inner surface 102 of the battery container 100 through the respective conducting members 54A, 54B having, respectively, the same polarities as the polarities of the corresponding electrode plates.

In the above-described first embodiment, the following effects can be obtained.

In the secondary battery of the first embodiment, the thin and spirally wound electrode group 6, which is unified with a cap and the like to form the electrode assembly 50 in advance, is inserted into the battery casing 1 in a position such that one turning end 60 of the electrode group faces the bottom of the battery casing.

(1) In the secondary battery of the first embodiment, the electrode plate end portions 6EE, 6DE are fixed by welding at the ultrasonic bonding sites 8A1, 8A2, 8B1, 8B2 in the joint leaves 54A, 54B. By virtue of this, the electrode plate end portions 6EE, 6DE can be prevented from turning upward without employing a step in which the electrode assembly 50 is carefully inserted into the battery casing 1 so that the electrode plate end portions 6EE, 6DE are not caught by the battery casing opening 11. Accordingly, the assembling time can be reduced, and thus the cost can be reduced.

(2) When the electrode plates are cut at a point in time that the respective total lengths of the electrode plates GE, 6D become the design values, the winding end portions 6EE, 6DE are expect to be present in the right positions for design within the respective ranges in which the joint leaves 54A, 54B extend (ranges 6WA, 6WB shown in FIG. 2). However, the winding conditions may cause a problem in that the winding end portions are not present in the design positions. For removing the problem, the fact that the winding end portions are (or have been) present in the right positions is detected, and the electrode plates 6E, 6D are cut so that the winding end portions are present in the design positions. Therefore, the electrode plate end portions can be surely fixed at the ultrasonic bonding sites of the joint leaves 54A, 54B.

(3) The winding end portions 6EE, 6DE of the positive and negative electrode plates 6E, 6D are positioned on the plane portion 102 on the same side of the battery container 100. Therefore, the lengths of the positive and negative electrode plates can be set to be the shortest.

(4) In addition to the effect in which the step for inserting the electrode group 6 into the battery casing 1 can be simplified, an effect is obtained in which the occurrence of short-circuiting between the respective winding end portions of the positive and negative electrode plates and the battery casing 1 can be prevented. This effect is due to the fact that the winding end portions 6ED, 6DD of the positive and negative electrodes 6E, 6D are arranged opposite to the inner surface of the battery casing 1 through the positive and negative joint leaves (conducting members) 54A, 54B. Even when the positive and negative electrode end portions turn upward, they are not in contact with the inner surface of the battery container, making it possible to prevent the occurrence of short-circuiting.

A rectangular secondary battery according to the second embodiment of the invention is described with reference to FIG. 8.

Second Embodiment

Figure 8:
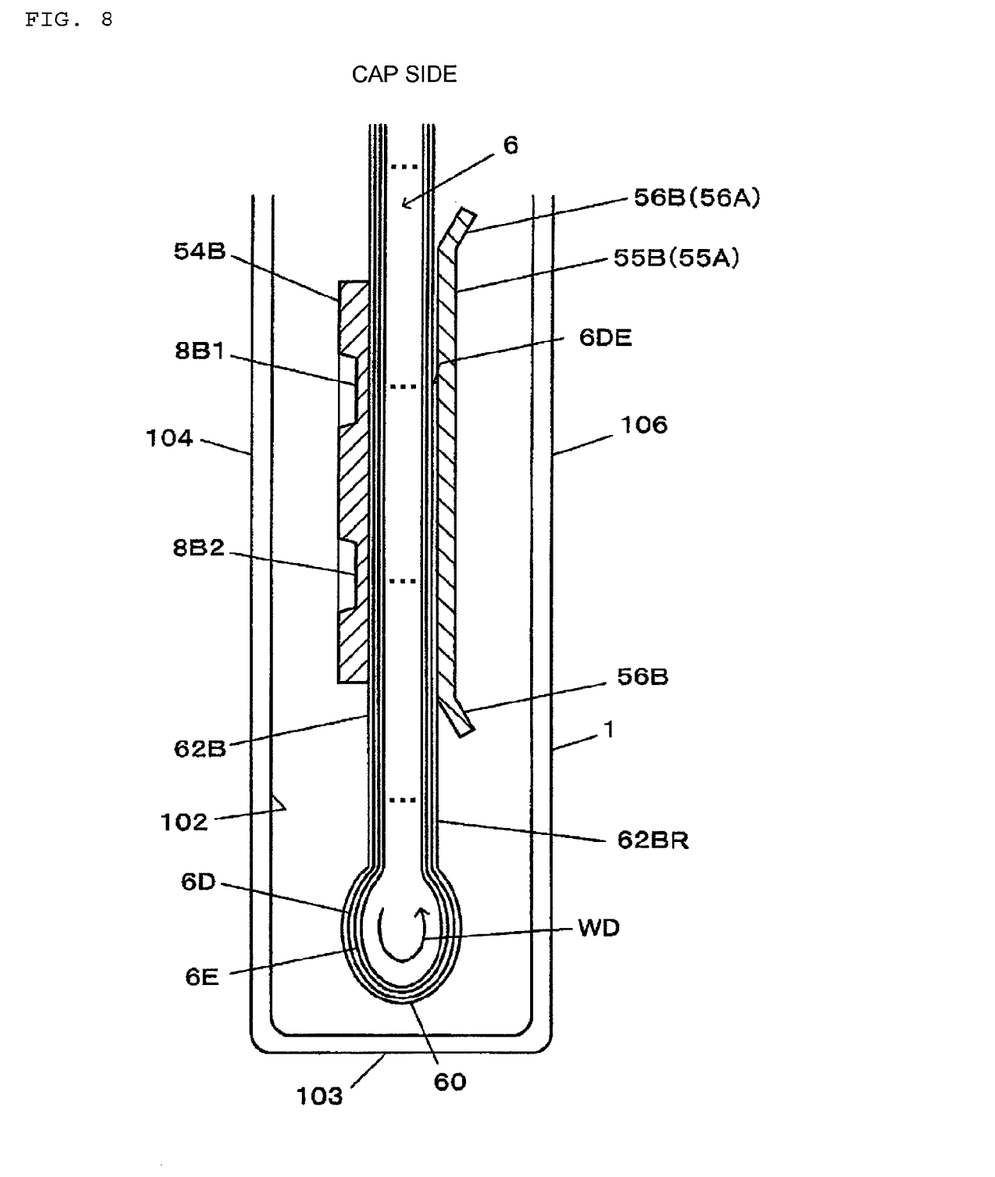
[FIG. 8] View showing the terminal of the electrode group in a secondary battery according to a second embodiment of the invention.

As shown in FIG. 8, the positive and negative electrode plates 6E, 6D and the separator 6C disposed between them are spirally wound together in the winding direction WD. Unlike the first embodiment, the winding end portion 6DE of the negative electrode plate 6D is positioned on a back surface 62BR of the plane portion 62B to which the joint leaf 54B is bonded. In the second embodiment, in ultrasonic bonding, the plane portion 62B, which is a negative foil collected portion, is sandwiched between the joint leaf 54B and a current collecting protective plate 55B and welded together. Therefore, the length of the negative electrode plate 6D is determined so that the winding end portion 6DE of the negative electrode plate 6D is positioned within the range in which the current collecting protective plate 55B extends.

Like the first embodiment, the negative electrode plate 6D is wound so that the end portion 6DE of the negative electrode plate 6D is positioned beyond the end portion 6EE of the positive electrode plate 6E. When this requirement is satisfied, the winding end portion GEE of the positive electrode plate 6E may be positioned in the range in which the current collecting protective plate 55A extends (not shown in FIG. 8), and may be positioned in the range in which the joint leaf 54A extends like the first embodiment. In any case, the winding end portion 6EE of the positive electrode plate 6E may be ultrasonic welded.

In the secondary battery of the second embodiment, like the first embodiment, the metallic foil exposed portions 6A, 6B of the positive and negative electrode plates 6E, 6D form respective stacked structures. The stacked structures are respectively sandwiched between the positive and negative connecting plates 5A, 5B which electrically connect the respective metallic foil exposed portions 6A, 6B to the positive and negative external terminals 4A, 4B, respectively, and respective current collecting protective plates 55A, 55B serving as cover plates for welding, and welded together. Between the winding end portion of the positive electrode plate 6E and the inner surface of the battery casing 1 is disposed any one of the connecting plate 5A and the current collecting protective plate 55A as a conducting member, and between the winding end portion of the negative electrode plate 6D and the inner surface of the battery casing 1 is disposed any one of the connecting plate 5B and the current collecting protective plate 55B as a conducting member.

Therefore, the electrode plate end portions 6EE, 6DE are prevented from turning upward without employing a special step when inserting the electrode group 6 into the battery casing 1. Further, an effect in which no short-circuiting occurs between the positive and negative electrode plates 6E, 6D and the inner surface of the battery casing 1 can be obtained. That is, the second embodiment exhibits the same effect as that obtained by the first embodiment by virtue of fixing the electrode plate end portions 6EE, 6DE by welding using the current collecting protective plates 55A, 55B.

As shown in FIG. 8, in the current collecting protective plates 55A, 55B at the both ends thereof as viewed in the depth direction of the battery container 100, curved portions 56A, 56B curved in the direction going away from the plane portions 62A, 62B are formed to prevent the plane portions 62A, 62B from suffering damage due to the ends of the current collecting protective plates 55A, 55B.

Modification Example

The above-described first and second embodiments can be modified as follows.

(1) In the above embodiment, the end portions 6EE, 6DE of the positive and negative electrode plates 6E, 6D are present in the positions of the ultrasonic bonding sites 8A1, 8A2, 8B1, 8B2. However, even in the case where the end portions 6EE, 6DE of the positive and negative electrode plates 6E, 6D are not present in the ultrasonic bonding sites 8A1, 8A2, 8B1, 8B2, when the end portions 6EE, 6DE are positioned within the respective ranges in which the joint leaves 54A, 54B extend in the longitudinal direction (in the depth direction of the battery casing) (ranges 6WA, 6WB shown in FIG. 2), the inner surfaces of the joint leaves 54A, 54B respectively push the winding end portions 6EE, 6DE to prevent the electrode plate end portions 6EE, 6DE from turning upward. That is, the winding end portions in the metallic foil exposed portions 6A, 6B of the positive and negative electrode plates 6E, 6D may be arranged opposite to the inner surface of the battery container through the respective conducting members.

(2) In the above embodiment, the end portions 6EE, 6DE of the positive and negative electrode plates 6E, 6D are present in the positions of the ultrasonic bonding sites 8A1, 8A2, 8B1, 8B2. However, when the connecting plates 5A, 5B having, respectively, the same polarities as the polarities of the corresponding electrode plates are respectively disposed between the end portions 6EE, 6DE of the positive and negative electrode plates 6E, 6D and the inner surface 102 of the battery casing, the winding end portions 6EE, 6DE of the electrode plates are not caught by the battery casing opening 11 when inserting the electrode assembly 50 into the battery casing. For example, the winding end portions 6EE, 6DE of the electrode plates 6E, 6D may be positioned in the turning portion 60 on the battery cap 3 side. In this case, the base portions 51A, 51B of the connecting plates 5A, 5B are conducting members, and, even when the winding end portion turns upward, it is not in contact with the battery cap 3, and the battery performance is not adversely affected.

In this Modification Example, in addition to the effect in which the step for inserting the electrode group 6 into the battery casing 1 can be simplified, an effect is obtained in which the occurrence of short-circuiting between the winding end portion and the battery casing 1 having polarity different from the polarity of the winding end portion can be prevented.

Specifically, the members for fixing the electrode plate end portions 6EE, 6DE by welding or fixing them by pushing are not limited to the connecting plates 5A, 5B in the first embodiment, and an arbitrary member capable of being welded to the plane portions 62A, 62B can be used.

(3) The present invention is not limited to the above-mentioned embodiments and Modification Example. For example, with respect to the connecting plates 5A, 5B which connect the exposed portions 6A, 6B of the electrode group 6 to the external terminals 4A, 4B, various forms and structures can be employed.

The external shape of the battery casing 1 described above is a shape of flattened rectangular parallelopiped, but the invention can be applied to various secondary batteries employing a battery casing having top and bottom wide surfaces facing to each other, i.e., a so-called thin container, and having the spirally wound electrode group 6 in the battery casing.

Further, the secondary battery of the invention is described above as a secondary battery for driving a rotating motor for a hybrid vehicle or an electric vehicle, but can be used as a power source for driving various rotating motors for railway vehicles and construction machines. Furthermore, the secondary battery of the invention can be used as a battery cell for use in a power source apparatus for electric power storage.

Moreover, the invention can also be applied to a cell employing a capacitor.

The contents disclosed in the basic patent application shown below, from which the priority is claimed, are incorporated hereinto as citations.

Japanese Patent Application No. 2010-194074 (filed on Aug. 31, 2010)

The invention claimed is:

1. A secondary battery comprising:
an electrode group including sheet-form positive and negative electrode plates each including a metallic foil having an active material applied onto both sides of the metallic foil, and a separator disposed between the positive and negative electrode plates, the positive and negative electrode plates and the separator being spirally wound together around a winding core into a flattened shape, the electrode group having, at the both ends thereof as viewed in the winding core direction, respectively formed metallic foil exposed portions of the positive and negative electrode plates onto which the active material is not applied;
a battery container which contains the electrode group therein, the battery container having a battery casing with opposing wide and narrow surfaces and a battery cap; and
positive and negative external terminals electrically connected to the metallic foil exposed portions of the positive and negative electrode plates, respectively,
wherein winding end portions in the metallic foil exposed portions of the positive and negative electrode plates are arranged opposite to the inner surface of the battery container through respective conducting members;
wherein the metallic foil exposed portions of the positive and negative electrode plates are stacked in the thickness wise direction of the battery casing to form respective stacked structures, wherein the stacked structures of the positive and negative electrode plates are respectively bonded to positive and negative connecting plates which electrically connect the respective metallic foil exposed portions to the positive and negative external terminals, respectively,
wherein the positive and negative connecting plates each have a respective joint leaf provided so as to face a wide surface of the battery casing, and respective connecting members which connect the joint leaves to the positive and negative external terminals, respectively, each connecting member extending to the battery cap along a narrow surface of the battery casing, and
wherein ultrasonic bonding sites are defined on each joint leaf and the joint leaves are respectively ultrasonically welded to the winding end portions of the positive and negative electrode plates to thereby fix the winding end portions in a direction towards the battery cap; and
wherein each connecting plate has a base portion extending along the inner surface of the battery cap, a side portion having a broad surface which extends curved from the base portion at a substantially right angle and to a lower portion of the electrode group such that the broad surface extends along a narrow sidewall of the battery casing toward a bottom, and the joint leaf extends from a lower half portion of the side portion and is curved toward the electrode group curved along the wide surface of the battery casing at a substantially right angle, the joint leaf and side portion together form a unified structure having an L-shaped cross-section and have high strength and high rigidity.

2. The secondary battery according to claim 1, wherein the metallic foil exposed portions of the positive and negative electrode plates are stacked in the thickness wise direction of the battery casing to form respective stacked structures, wherein the stacked structures are compressed, and the respective conducting members are bonded to the outermost layers of the stacked structures.

3. The secondary battery according to claim 2, wherein the respective conducting members have, respectively, the same polarities as the polarities of the corresponding positive and negative electrode plates.

4. The secondary battery according to claim 3, wherein the respective conducting members are positive and negative connecting plates which electrically connect the respective metallic foil exposed portions to the positive and negative external terminals, respectively, wherein the positive and negative connecting plates are attached to the battery cap.

5. The secondary battery according to claim 1, wherein the metallic foil exposed portions of the positive and negative electrode plates are stacked in the thickness wise direction of the battery casing to form respective stacked structures, wherein the stacked structures of the positive and negative electrode plates are respectively sandwiched between positive and negative connecting plates which electrically connect the respective metallic foil exposed portions to the positive and negative external terminals, respectively, and respective current collecting protective plates, and bonded together.

6. The secondary battery according to claim 1, wherein the battery casing has a shape of thin rectangular parallelopiped having wide surfaces as top and bottom surfaces and narrow surfaces as sidewalls,
wherein the electrode group has a pair of plane portions opposite to the wide surfaces extending on the top and bottom of the battery casing, and turning portions at which the positive and negative electrode plates are turned back at the both ends of the pair of plane portions,
wherein the winding end portion is positioned in the plane portion.

7. The secondary battery according to claim 1, wherein the winding end portions of the positive and negative electrode plates are arranged in positions opposite to the same plane portion of the battery casing.

8. The secondary battery according to claim 1, wherein the winding end portion of the negative electrode plate is arranged so as to cover the winding end portion of the positive electrode plate.

9. A method for producing a secondary battery, comprising:
a first step of forming an electrode group which comprises sheet-form positive and negative electrode plates each comprising a metallic foil having an active material applied onto both sides of the metallic foil, and a separator disposed between the positive and negative electrode plates, the positive and negative electrode plates and the separator being spirally wound together around a winding core into a flattened shape, the electrode group having, at the both ends thereof as viewed in the winding core direction, respectively formed metallic foil exposed portions of the positive and negative electrode plates onto which the active material is not applied;
a second step of connecting the metallic foil exposed portions of the positive and negative electrode plates to positive and negative external terminals, respectively, by positive and negative connecting plates;
a third step of placing the electrode group having connected thereto the positive and negative connecting plates in a battery container having a thin shape; and
a fourth step of closing the battery container after the third step,
wherein the first step comprises a fifth step of cutting the positive and negative electrode plates so that winding end portions in the metallic foil exposed portions of the positive and negative electrode plates are respectively arranged in predetermined positions on the surface of the electrode group,
wherein, in the second step, the winding end portions of the positive and negative electrode plates are respectively bonded to the positive and negative connecting plates in a direction towards the battery terminals,
the metallic foil exposed portions of the positive and negative electrode plates are stacked in the thickness wise direction of the battery casing to form respective stacked structures, such that in the second step the stacked structures of the positive and negative electrode plates are respectively bonded to positive and negative connecting plates which electrically connect the respective metallic foil exposed portions to the positive and negative external terminals, respectively; and
the positive and negative connecting plates each have a respective joint leaf provided so as to face a wide surfaces of the battery container, and respective connecting members which connect the joint leaves to the positive and negative external terminals, respectively, wherein each connecting plate has a base portion extending on top of the electrode group, a side portion having a broad surface which extends curved from the base portion at a substantially right angle and to a lower portion of the electrode group such that the broad surface extends along a narrow sidewall of the battery container toward a bottom, and the joint leaf extends from a lower half portion of the side portion and is curved toward the electrode group curved along the wide surface of the battery casing at a substantially right angle, the joint leaf and side portion together form a unified structure having an L-shaped cross-section and have high strength and high rigidity, and
wherein ultrasonic bonding sites are defined on each joint leaf such that in the second step the joint leaves are respectively ultrasonically welded to the winding end portions of the positive and negative electrode plates to thereby fix the winding end portions.

10. The method for producing a secondary battery according to claim 9, wherein the battery container has a shape of thin rectangular parallelopiped having wide surfaces as top and bottom surfaces and narrow surfaces as sidewalls,
wherein, in the first step, winding is performed so that the electrode group has a pair of plane portions opposite to the wide surfaces extending on the top and bottom of the battery container, and turning portions at which the positive and negative electrode plates are turned back at the both ends of the pair of plane portions, and the winding end portion is positioned in the plane portion.

11. The method for producing a secondary battery according to claim 10, wherein, in the first step, the winding end portions of the positive and negative electrode plates are arranged in positions opposite to the same plane portion of the battery container.

12. The method for producing a secondary battery according to claim 9, wherein the winding end portion of the negative electrode plate is arranged so as to cover the winding end portion of the positive electrode plate.

13. A method for producing a secondary battery, comprising:
a first step of forming an electrode group which comprises sheet-form positive and negative electrode plates each comprising a metallic foil having an active material applied onto both sides of the metallic foil, and a separator disposed between the positive and negative electrode plates, the positive and negative electrode plates and the separator being spirally wound together around a winding core into a flattened shape, the electrode group having, at the both ends thereof as viewed in the winding core direction, respectively formed metallic foil exposed portions of the positive and negative electrode plates onto which the active material is not applied;

a second step of connecting the metallic foil exposed portions of the positive and negative electrode plates to positive and negative external terminals, respectively, by positive and negative connecting plates;

a third step of placing the electrode group having connected thereto the positive and negative connecting plates in a battery container having a thin shape; and a fourth step of closing the battery container after the third step, wherein the first step comprises a fifth step of cutting the positive and negative electrode plates so that winding end portions in the metallic foil exposed portions of the positive and negative electrode plates are respectively arranged in predetermined positions on the surface of the electrode group, wherein, in the second step, the winding end portions of the positive and negative electrode plates are respectively bonded to the positive and negative connecting plates, wherein the fifth step comprises:

a sixth step of measuring winding lengths of the positive and negative electrode plates, and a seventh step of determining cutting points of the positive and negative electrode plates, based on the respective winding lengths of the positive and negative electrode plates measured in the sixth step, wherein, in the seventh step, the lengths are determined so that the winding end portions in the metallic foil exposed portions of the positive and negative electrode plates are arranged opposite to the inner surface of the battery container through the respective positive and negative connecting plates having, respectively, the same polarities as the polarities of the corresponding electrode plates.

* * * * *